United States Patent [19]

Donohue et al.

[11] Patent Number: 4,523,299

[45] Date of Patent: Jun. 11, 1985

[54] MESSAGE TRANSMITTING SYSTEM FOR REPRODUCTION MACHINES AND COPIERS

[75] Inventors: James M. Donohue, Los Alamitos; Robert E. Markle, Rancho Palos Verdes; George E. Mager, Hermosa Beach, all of Calif.; Stephen P. Wilczek, Fairport, N.Y.

[73] Assignee: Xerox Corporation, Stamford, Conn.

[21] Appl. No.: 421,019

[22] Filed: Sep. 21, 1982

[51] Int. Cl.[3] .......... G06F 9/00; G03G 15/00

[52] U.S. Cl. .......... 364/900; 355/14 C

[58] Field of Search .......... 364/200, 900; 355/14 C, 355/14 SL, 26, 14, 4; 325/58

[56] References Cited

U.S. PATENT DOCUMENTS

| | | | |
|---|---|---|---|
| 3,651,474 | 3/1972 | Liberman | 325/58 |
| 3,936,182 | 2/1976 | Sheikh | 364/900 X |
| 4,058,850 | 11/1977 | Sheikh | 364/900 |
| 4,203,663 | 5/1980 | Ogura et al. | 355/14 C |
| 4,227,798 | 10/1980 | Steiner | 355/14 C |
| 4,305,654 | 12/1981 | Shimizu et al. | 355/14 C |
| 4,338,023 | 7/1982 | McGibbon | 355/14 SH |
| 4,383,297 | 5/1983 | Sander et al. | 364/200 |

*Primary Examiner*—Harvey E. Springborn

*Attorney, Agent, or Firm*—Frederick E. McMullen

[57] ABSTRACT

A copy reproduction machine is subdivided into discrete operating modules and coupled together by a shared communication line over which operating messages from and to the modules are transmitted. Each module includes a receiver for intercepting and capturing messages bearing the module's address and a transmitter for transmitting messages from the module and addressed to other modules over the shared communication line.

4 Claims, 12 Drawing Figures

MESSAGE TRANSMITTING SYSTEM FOR REPRODUCTION MACHINES AND COPIERS

The invention relates to a reproduction machine and more particularly to an improved apparatus and method for transmitting operating and control instructions between the various components that comprise the machine.

In the early days when copiers or reproduction machines first appeared, the various electrically operated components and modules that comprised such machines were normally connected by wire. As the art advanced and the machines became faster and more complex and offered to the user more features, such as multiple paper trays, image reduction, automatic toner dispensing, automatic document handling, sorting, etc., the number of electrical connections increased dramatically. This led to something identified by many as the "copper choke" problem, i.e. the problem with finding a place for the large mass of wiring that had to be routed through the machine confines. While some relief from this problem could be obtained by making the machine physically larger, this unfortunately directly contradicted the industry trend and user demand for smaller more compact machines.

Other solutions such as matrix distribution to reduce the number of wires were advanced. And, while some relief was obtained, the continued desire for faster machines, more features, etc. soon overcame any advantages that were realized.

The present invention overcomes or at least alleviates the foregoing by providing, in a copy reproduction machine for making copies of document originals having a master control module and remote operating modules cooperable with one another to form the copy reproducing machine, a shared communication line linking the modules together, the shared communication line serving as the sole vehicle for transmitting control instructions for making copies between the modules; a shared line transmitter for each of the modules including an addresser for addressing control instructions from the module to at least one other of the modules, and a control unit for placing the control instructions following addressing onto the shared communication line for transmission through the shared communication line to the modules; and a shared line receiver for each of the modules including a sensor for detecting control instructions addressed to the module from control instructions addressed to other modules being transmitted on the shared communication line, and a receive element for passing control instructions addressed to the module from the shared communication line to the module.

The present invention further provides a method of operatively integrating plural discrete copier modules to provide a copier operable to produce copies of document originals, each copier module generating and receiving operating instructions, comprising the steps of: addressing operating instructions at each of the copier modules for transmission to at least one other of the copier modules; inserting the addressed operating instructions into a common serial stream of operating instructions being transmitted between the copier modules; and receiving at each of the copier modules operating instructions in the serial stream addressed to the copier module.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
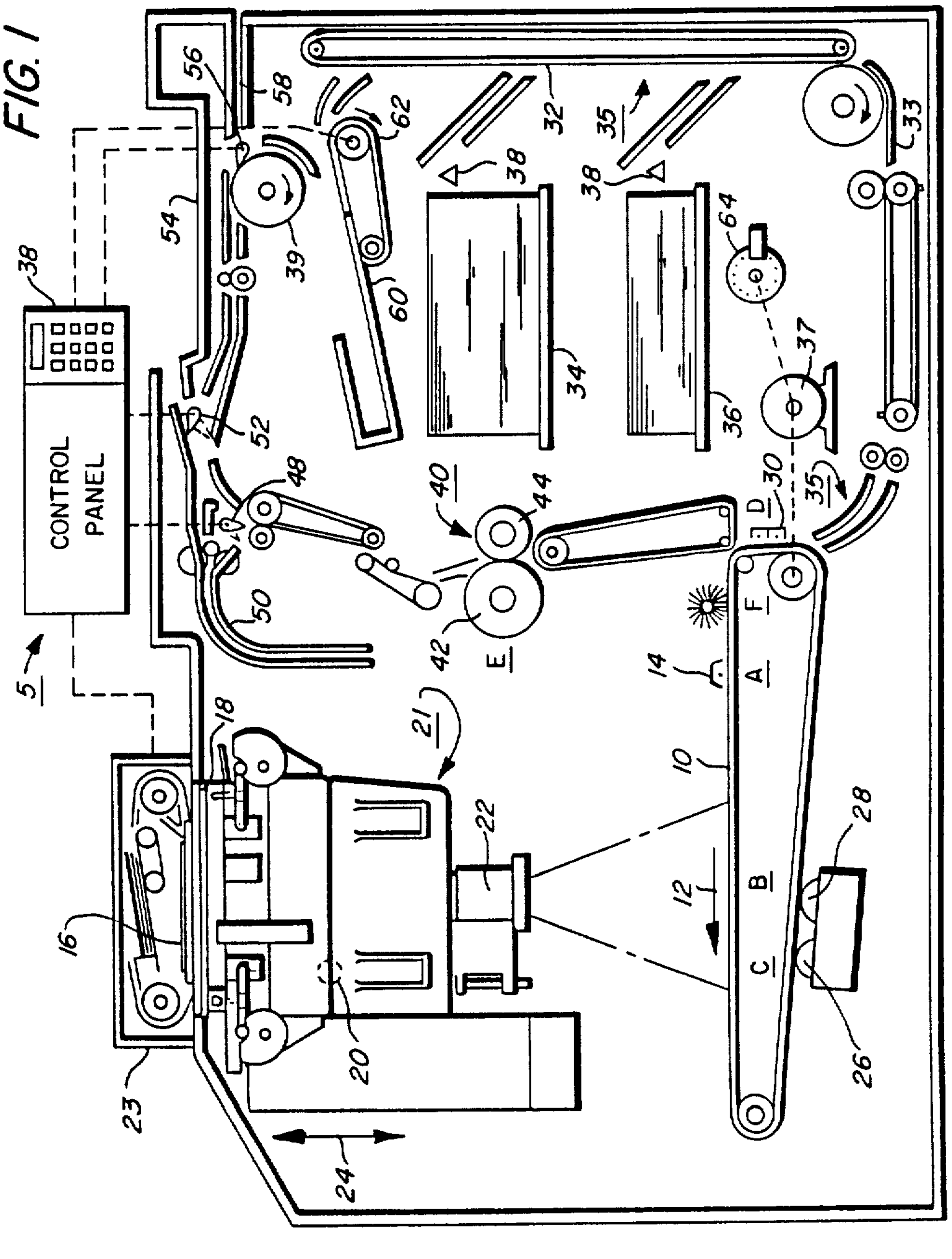
FIG. 1 is a plan view of a reproduction machine or copier incorporating the message transmission system of the present invention.

For a general understanding of the features of the present invention, reference is had to the drawings. In the drawings, like reference numerals have been used throughout to designate identical elements. FIG. 1 schematically depicts the various components of an illustrative electrophotographic printing machine 5 incorporating the system of the present invention therein. It will become evident from the following discussion that the invention is equally well suited for use in a wide variety of printing machines and is not necessarily limited in its application to the particular embodiment shown herein.

Inasmuch as the art of electrophotographic printing is well known, the various processing stations employed in the printing machine 5 will be shown hereinafter schematically and their operation described briefly with reference thereto.

As shown in FIG. 1, the illustrative electrophotographic printing machine 5 employs a belt 10 having a photoconductive surface thereon. Preferably, the photoconductive surface is made from a selenium alloy. Belt 10 moves in the direction of arrow 12 to advance successive portions of the photoconductive surface through the various processing stations disposed about the path of movement thereof.

Initially, a portion of the photoconductive surface passes through charging station A. At charging station A, a corona generating device, indicated generally by the reference numeral 14, charges the photoconductive surface to a relatively high substantially uniform potential.

Next, the charged portion of the photoconductive surface is advanced through imaging station B. At imaging station B, a document handling unit, indicated generally by the reference numeral 23, positions original documents 16 facedown over exposure system 21. The exposure system, indicated generally by reference numeral 21 includes lamp 20 which illuminates the document 16 positioned on transparent platen 18. The light rays reflected from document 16 are transmitted through lens 22. Lens 22 focuses the light image of original document 16 onto the charged portion of the photoconductive surface of belt 10 to selectively dissipate the charge thereof. This records an electrostatic latent image on the photoconductive surface which corresponds to the informational areas contained within the original document. Thereafter, belt 10 advances the electrostatic latent image recorded on the photoconductive surface to development station C. Platen 18 is mounted movably and arranged to move in the direction of arrows 24 to adjust the magnification of the original document being reproduced. Lens 22 moves in synchronism therewith so as to focus the light image of original document 16 onto the charged portion of the photoconductive surface of belt 10.

Document handling unit 23 sequentially feeds documents from a stack of documents placed by the operator in a normal forward collated order in a document stacking and holding tray. The documents are fed from the holding tray, in seriatim, to platen 18. The document handling unit recirculates documents back to the stack supported on the tray. Preferably, the document handling unit is adapted to serially sequentially feed the documents, which may be of various sizes and weights of paper or plastic containing information to be copied. The size of the original document disposed in the holding tray and the size of the copy sheet are measured. Preferably, magnification of the imaging system is adjusted to insure that the indicia or information contained on the original document is reproduced within the space of the copy sheet.

While a document handling unit has been described, one skilled in the art will appreciate that the original document may be manually placed on the platen rather than by the document handling unit. This is required for a printing machine which does not include a document handling unit.

A plurality of sheet transports 32 and sheet guides 33 cooperate to form a paper path 35 through which the copy sheets being processed pass from either main paper supply tray 34, or auxiliary paper supply tray 36, or duplex paper supply tray 60 through the machine 5 to either output tray 54 or discharge path 58. Transports 32 are driven by motor 37 which also drives machine clock 64. Suitable sheet sensors designated here by the numeral 38, are provided at the output of each paper tray 34, 36 and duplex tray 60 to detect feeding of a sheet therefrom.

With continued reference to FIG. 1, at development station C, a pair of magnetic brush developer rollers, indicated generally by the reference numerals 26 and 28, advance a developer material into contact with the electrostatic latent image. The latent image attracts toner particles from the carrier granules of the developer material to form a toner powder image on the photoconductive surface of belt 10.

After the electrostatic latent image recorded on the photoconductive surface of the belt 10 is developed, belt 10 advances the toner powder image to transfer station D. At transfer station D, a copy sheet is moved into transfer relation with the toner powder image. Transfer station D includes a corona generating device 30 which sprays ions onto the backside of the copy sheet. This attracts the toner powder image from the photoconductive surface of belt 10 to the sheet. After transfer, the sheet is advanced to fusing station E.

Fusing station E includes a fuser assembly, indicated generally by the reference numeral 40, which permanently affixes the transferred powder image to the copy sheet. Preferably, fuser assembly 40 includes a heated fuser roller and backup roller 44. The sheet passes between fuser roller 42 and backup roller 44 with the powder image contacting fuser roller 42. In this manner, the powder image is permanently affixed to the sheet.

After fushing, the sheet is transported to gate 48 which functions as an inverter selector. Depending upon the position of gate 48, the copy sheets will either be deflected into a sheet inverter 50 or bypass sheet inverter 50 and be fed directly onto a second decision gate 52. Thus, copy sheets which bypass inverter 50 turn a 90° corner in the paper path before reaching gate 52. Gate 52 inverts the sheets into a faceup orientation so that the imaged side which has been transferred and fused is faceup. If inverter path 50 is selected, the opposite is true, i.e. the last printed face is facedown. Second decision gate 52 deflects the sheet directly into an output tray 54 or deflects the sheet into a path which carries the sheet to a third decision gate 56. Gate 56 either passes the sheets directly on without inversion to the copier or routes the sheets to a duplex inverter roll 39. Inverting roll 39 inverts and stacks the sheets to be duplexed in a duplex tray 60 when gate 56 so directs. Duplex tray 60 provides intermediate or buffer storage for those sheets which have been printed on one side and on which an image will be subsequently printed on the side opposed thereto, i.e. the copy sheets being duplexed. Due to the sheet inverting action of roll 39, the buffer set sheets are stacked in duplex tray 60 facedown in the order in which the sheets have been copied.

In order to complete duplex copying, the previously simplexed sheets in tray 60 are fed seriatim by bottom feeder 62 back into the paper path 35 and transfer station D for transfer of the toner powder image to the opposed side of the sheet. Movement of the sheet along the paper path produces an inversion thereof. However, inasmuch as the bottommost sheet is fed from duplex tray 60, the proper or clean side of the copy sheet is positioned in contact with belt 10 at transfer station D so that the toner powder image thereon is transferred thereto. The duplex sheets are then fed through the same path as the previously simplexed sheets to be stacked in tray 54 for subsequent removal by the printing machine operator. In order to operate reproduction machine 5 and drive the various components thereof, suitable power supplies are provided as will be understood by those skilled in the art.

Figure 2:
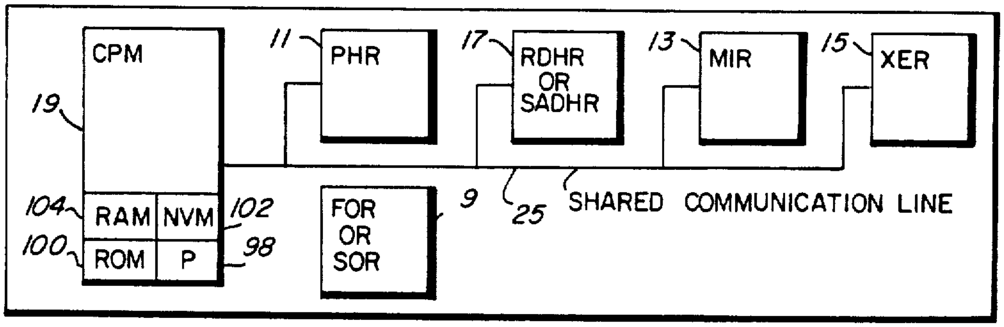
FIG. 2 is a schematic view illustrating the remote subdivisions and shared communication channel for the machine shown in FIG. 1.

Referring particularly to FIG. 2, reproduction machine 5 is segregated into a main controller module, identified as central processing master or CPM 19 (included as a remote herein for purposes of describing the method and apparatus for transmitting messages between CPM 19 and SCL 25), and a plurality of sub controller modules (termed remotes herein), and identified as finishing output remote (FOR) 9, paper handling remote (PHR) 11, marking an imaging remote (MIR) 13, xerographic remote (XER) 15, and recirculating document handler remote (RDHR) 17. PHR 11, MIR 13, XER 15, RDHR 17, and CPM 19 are communicated with one another by means of a shared communication line (SCL) 25 through which control instructions synchronized by clock pulse signals from clock 64, pass from and to the machine remotes.

CPM 19, which sends and receives information from all of the remotes, communicates the activities that the remotes will perform. CPM 19 includes a suitable microprocessor 98, permanent memory in the form of ROM memory section 100 to control the activities of reproduction machine 5, non-volatile memory section or NVM 102 for storing configuration and operating parameters for the particular machine (i.e. billing codes, accessories, etc.) and RAM memory section 104 for temporarily storing information such as the copy run programmed by the operator or user through control panel 38. CPM 19 transmits and receives messages to and from the SCL 25 through a SCL interface 116 described hereinafter.

Figure 3:
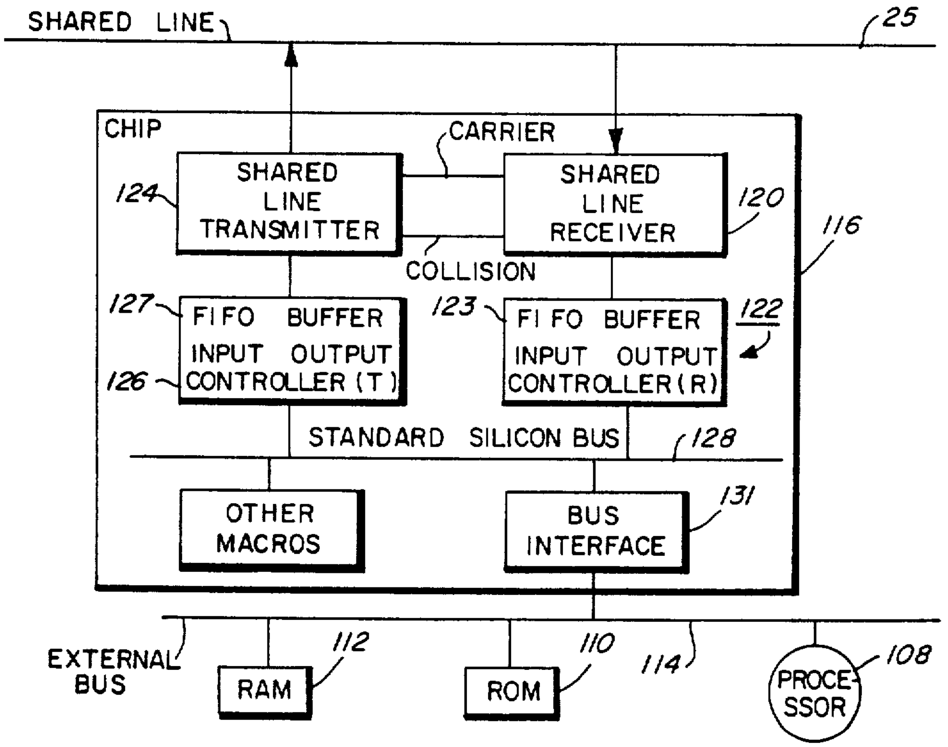
FIG. 3 is a schematic view illustrating the principal parts of each remote.

Referring particularly to FIG. 3, each remote FOR 9, PHR 11, MIR 13, XER 15, and RDHR 17 includes a suitable microprocessor 108, ROM and RAM memory sections 110, 112 respectively, external bus 114, and SCL interface 116. Bus 114 couples the remote's processor 108 and memory sections 110, 112 to the SCL interface 116 and to the various machine subsystems controlled by the remote such as the paper feed registration and transports 32 of PHR 11, exposure system 21 of MIR 13, magnetic brush rollers 26, 28 of XER 15, document handler subsystem 23 of RDHR 17, etc.

SCL 25 comprises a medium for communicating between CPM 19 and the remote processor modules, FOR 9, PHR 11, MIR 13, XER 15, RDHR 17, which together cooperate to form reproduction machine 5. SCL 25 itself may be a twisted pair although other media such as coaxial cable may be envisioned.

To allow CPM 19 and the remotes to receive information from one another through SCL 25, each interface 116 includes a shared line receiver or SLR 120. SLR 120, which is under the control of an input/output controller receiver IOCR 122 converts serial data bits input through SCL 25 to parallel data for use by the remote. To allow the remotes to transmit information to one another through SCL 25, interface 116 has a shared line transmitter or SLT 124, which is under the control of input/output controller transmitter or IOCT 122. SLT 124 converts parallel data from the remote to serial bits and places the bits onto SCL 25. An internal bus 128 interfaces with external bus 114 through bus interface 131.

Figure 4:
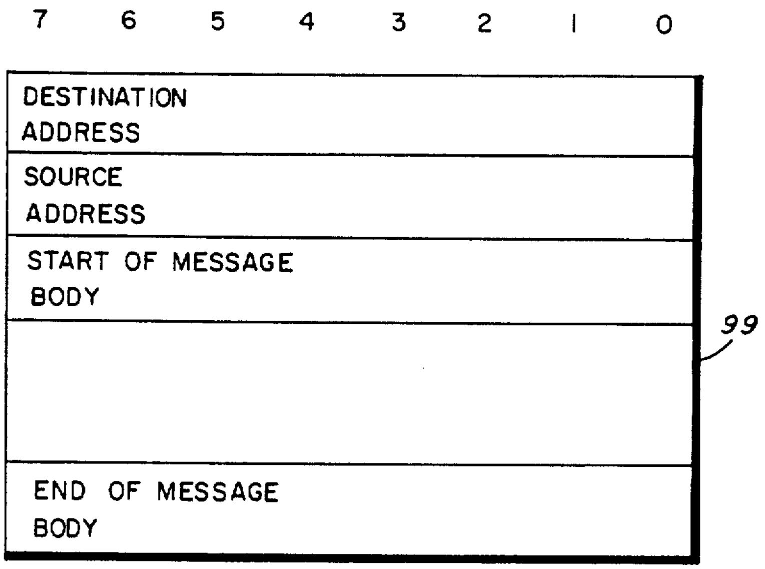
FIG. 4 is a view illustrating the makeup of a message packet.
Figure 5:
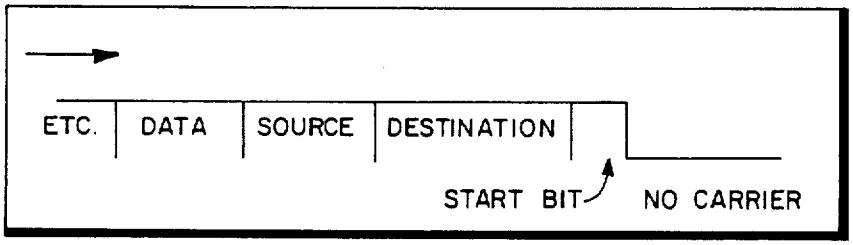
FIG. 5 is a view illustrating a message packet in serial bit form.

Referring to FIGS. 4 and 5, all messages on SCL 25 are in the form of packets 99, each packet utilizing a common format which is set up by the transmitting remote. Each packet 99 includes a destination address, source address, start of message body, and end of message body. Each message packet 99, which is transmitted in bit serial form, is preceded by a start bit. A message packet placed on SCL 25 propagates to all remotes but is accepted or received only where the destination address matches the remote's identification address. Alternately, a destination address of all zeroes (00) may be used which is interpreted by the remote's SLR's 120 as a broadcast message addressed to all remotes on the SCL 25. In addition, a remote may be set up to receive all messages.

The source address identifies the transmitting remote. The SLT 124 of the transmitting remote adds the single start bit in front of the destination address byte and appends cyclic redundancy check sum or CRC bytes to the last of the message as will appear. The start bit and the CRC bytes are stripped from the message by the remote's SLR 120 before the message is passed on to the FIFO buffer 123 of the receiving remotes IOCR 122. The arrangement of information in the body of the message is called protocol which is dictated by the system software.

The SCL 25 is accessed by the SLR 120 and SLT 124 of the SCL interface 116 of each remote, control of access to SCL 25 resting with each receiving and transmitting remote. A remote with a message ready to transmit defers to a transmission already in progress. A remote may initiate a transmission only when SCL 25 is clear. If two remotes transmit a message simultaneously, it will result in an interference, (termed a collision) of one transmission with another. If a collision is detected, the detecting remote aborts its own transmission and jams SCL 25. The purpose of jamming SCL 25 is to insure that all remotes recognize the collision and abort their own transmissions, thus putting all remotes in a back off state.

Operation of the remote's SLR 120 or SLT 124 is by a command from the remotes RAM memory section 112. The command is transferred from the RAM memory section 112 to the IOCR 122 or IOCT 126 where the command is implemented by means of signals to the IOCT/SLR or IOCR/SLT interface logic. Before a message transfer operation, the identification address in the SLR 120 may be modified and the mode of operation of the SLR 120 or SLT 124 established. Following the message transfer operation, the SLR or SLT returns the status information to the IOCR 122 or IOCT 126 for use by the remote's processor.

Figure 6:
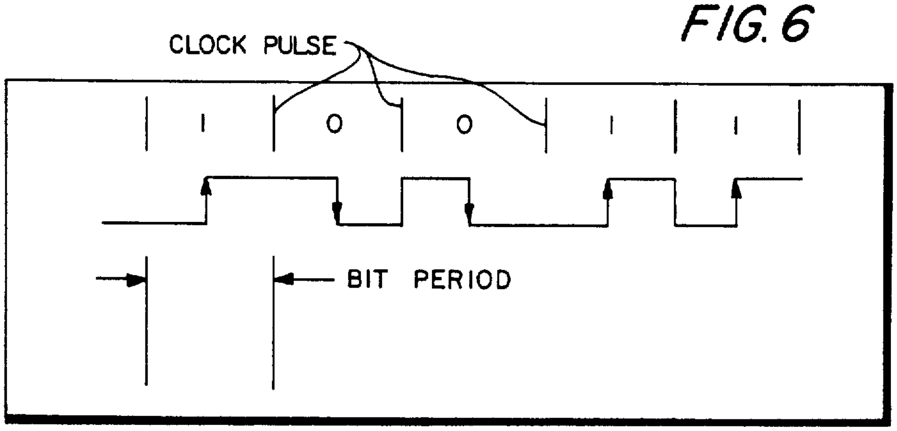
FIG. 6 is a view illustrating a phase encoded message packet.

For one remote to be able to defer to another, the remote must be able to detect the presence of a message packet on SCL 25. In a preferred transmission method and as shown in FIG. 6, messages on SCL 25 are phase encoded with the intelligence contained in the transition from one logic level to the other, a down transition being a "0" and an up transition being a "1". The bit transitions occur approximately at the middle of the bit period, which is defined by machine clock signals and to obtain the signal at the proper level for the next bit transition, a bit cell transition may take place within the bit period boundary, as in the bit cell transition between data bits 0 and 0 or 1 and 1. Phase encoding is advantageous in a system such as described since each remote is running on its own clock and because the method accommodates broad tolerance variations between the periods of the separate clocks. Because the method effects synchronization in relation to the start bit transition, a separate strobe line is unnecessary.

Since there is at least one transition from one logic level to the other in each bit interval, the fact that a message is present can therefore be detected at every bit period by the occurrence of a transmission. In this event, a carrier is said to be present.

The SLR 120 of each remote monitors SCL 25. Where the SLR 120 detects a carrier on SCL 25, that is, the occurrence of two or more transitions in a bit period indicating a transmission, the SLR 120 notifies the remote's SLT 124 causing SLT 124 to defer transmitting until SCL 25 is quiet. If the SLR 120 detects a collision on SCL 25 (meaning another remote is also attempting to transmit) the SLR 120 notifies the remote's SLT 124 to abort any transmission. Additionally, the SLR 120 jams the SCL 25 long enough to be certain that all SLRs on SCL 25 have detected the condition. As a result, collisions are minimized because each remote SLT 124 defers accessing SCL 25 when SCL 25 is in use, it being understood that collisions can only occur when several remotes are waiting for the SCL 25 to become available and begin transmitting at the same time.

Where a collision is detected, each transmitting remote's SLT 124 backs off attempting to transmit for a random time interval following the expiration of which transmission is again attempted. If the random back off periods of two or more remotes time out close to each other and several transmissions are initiated at almost the same time, the remote that is the first to detect the collision will abort its own transmission and reschedule it after doubling the back off interval. Meantime, the remote jams the SCL 25 by putting out a high level signal for two bit periods to assure that all remotes are aware of the interference condition. Once a transmission has been on the SCL 25 long enough to reach all remotes, it is deferred to and runs to termination barring noise which simulates a collision.

To avoid any error in the receive message, the transmitting remote adds a cyclic redundancy check sum (CRC) to each message and the receiving remote verifies the sum. Detection of a CRC error by a receiving remote may cause the remote to refuse to acknowledge receipt of the message forcing the transmitting remote to repeat the message.

If a remote's SLR 120 matches the destination address at the head of the incoming message to its own identification address, or if SLR 120 recognizes the address designated for broadcast to all remotes, or if SLR 120 is in the promiscuous mode (i.e. instructed to receive all messages), SLR 120 accepts the bit serial message, performs a cyclic redundancy check sum (CRC) test, converts the message to byte parallel data, and passes the data via the remote's IOCR 122 to RAM memory section 112 where the data is available to the remote's processor 98, 108.

Each remote is independent of the other remotes, that is, there is no central control that might interfere with operation of the messages being transmitted between the remotes along SCL 25. Accordingly failure of one remote does not ordinarily affect the other remotes or SCL 25 insofar as communications between the remotes are concerned. However, operation of reproduction machine 5 may be inhibited or stopped where the failed remote is essential for machine operation. In cases where the remote is not essential to operate the reproduction machine 5 such as for example FOR 9, operation of the reproduction machine 5 may be continued but with restriction.

Figure 7:
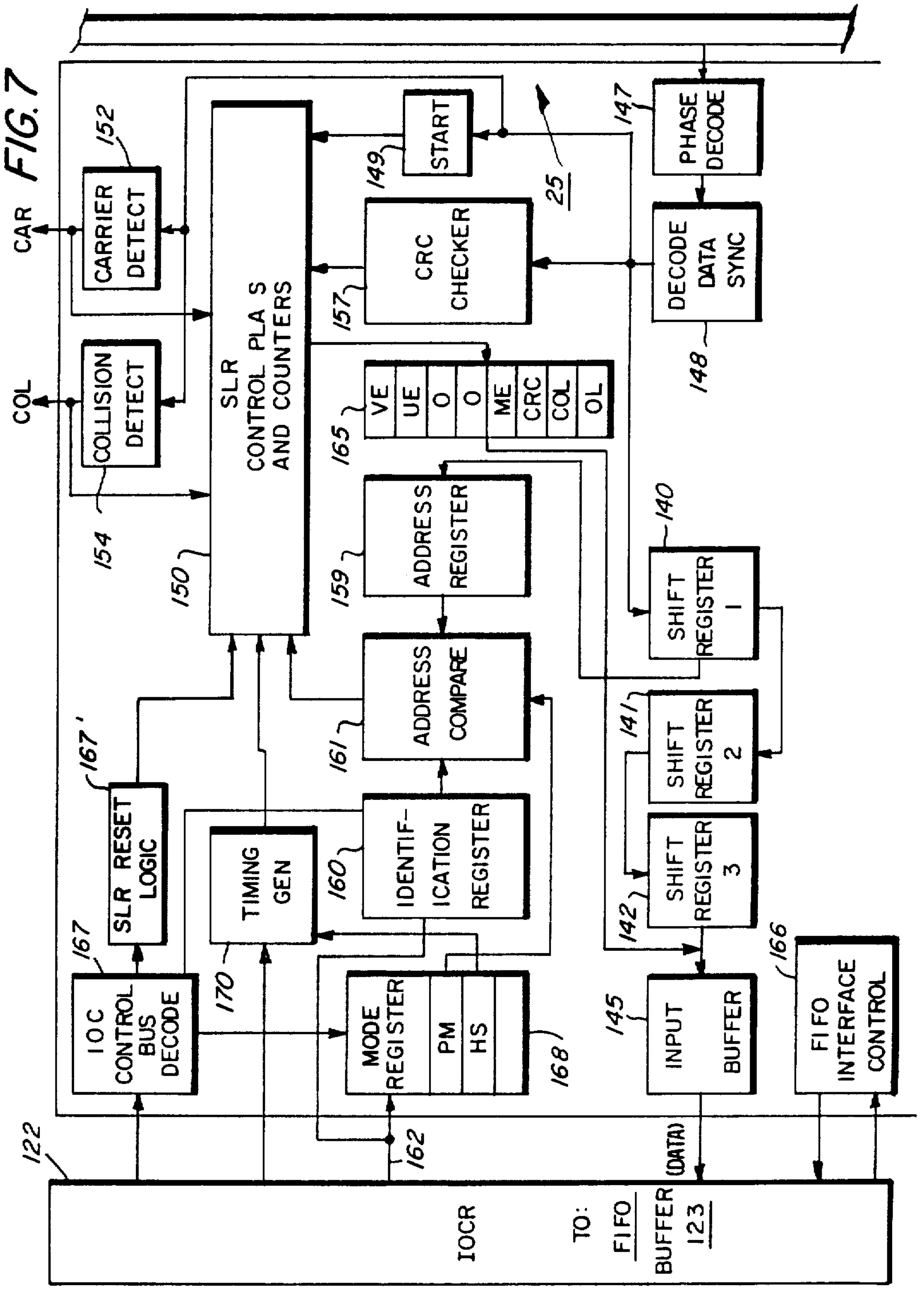
FIG. 7 is a schematic view illustrating the principal components of the shared line receiver (SLR)

Referring now to FIG. 7, SLR 120 accepts the phase encoded bits serially that comprise the message packet 99 from SCL 25 and passes the bits through a series of shift registers 140, 141, 142 which shift the serial bit stream into byte form. From shift register 142, the bytes are fed to an input buffer 145 where the bytes are available for transfer in parallel to the FIFO buffer 123 of IOCR 122. Prior to input of the message to shift register 140, a phase decoder 147 converts the messages phase transitions into a series of logic signals identifying the message start, carrier detection, collision detection, and data. The decoded message output by phase decoder 147 is passed via data synchronizing logic 148 to shift register 140.

When the first byte of the message, which contains the destination address is available in register 140, the byte is transferred to an address recognition register 159 and compared with the identification address of the remote which is contained in an identification register 160 by a comparator circuit 161. The identification address is obtained through data bus 162 from IOCR 122. If the addresses match, a programmed logic array or PLA 150, which serves as the central controller for SLR 120, is set to receive the entire message. Similarly, if the destination address is zero (broadcast mode) or if the promiscuous mode (PM) is set, the PLA logic 150 is set to receive the entire message. If the addresses fail to match, the message is not passed through to IOCR 122 to avoid occupying the remote's processor 98, 108 and RAM memory section 104, 112 unnecessarily.

After matching the addressess, the data is shifted serially from shift register 140 into shift register 141 and then into shift register 142, multi-shift registers being provided so that the CRC bits contained in the final two bytes of the message will not be passed to the IOCR 122. At the time SCL 25 goes quiet, indicating the end of the message, the two CRC bytes are in shift registers 140, 141 while the final byte of the message is in shift register 142.

CRC checker 157 processes all the bits in the incoming message. Where an error is detected, the signal to PLA 150 sets the appropriate status bit in status register 165. CRC checker 157 detects errors in accordance with the polynomial $X^{16}+X^{15}+X^2+1$.

When input buffer 145 is full and the FIFO buffer of IOCR 126 is not full, the byte in the input buffer 140 is written into the FIFO buffer of IOCR 126 under the direction of interface control 166. Start logic 149 recognizes the "0" to "1" transition of the start bit and informs PLA 150 of the start of a message packet 99. Carrier detect logic 152 recognizes the presence of a carrier (CAR) on SCL 25 and informs the remote's SLT 124 and PLA 150. Collision detect logic 154 recognizes the presence of more than one transmission on SCL 125 (COL) and informs the remote's SLT 124 and PLA 150.

Figure 8:
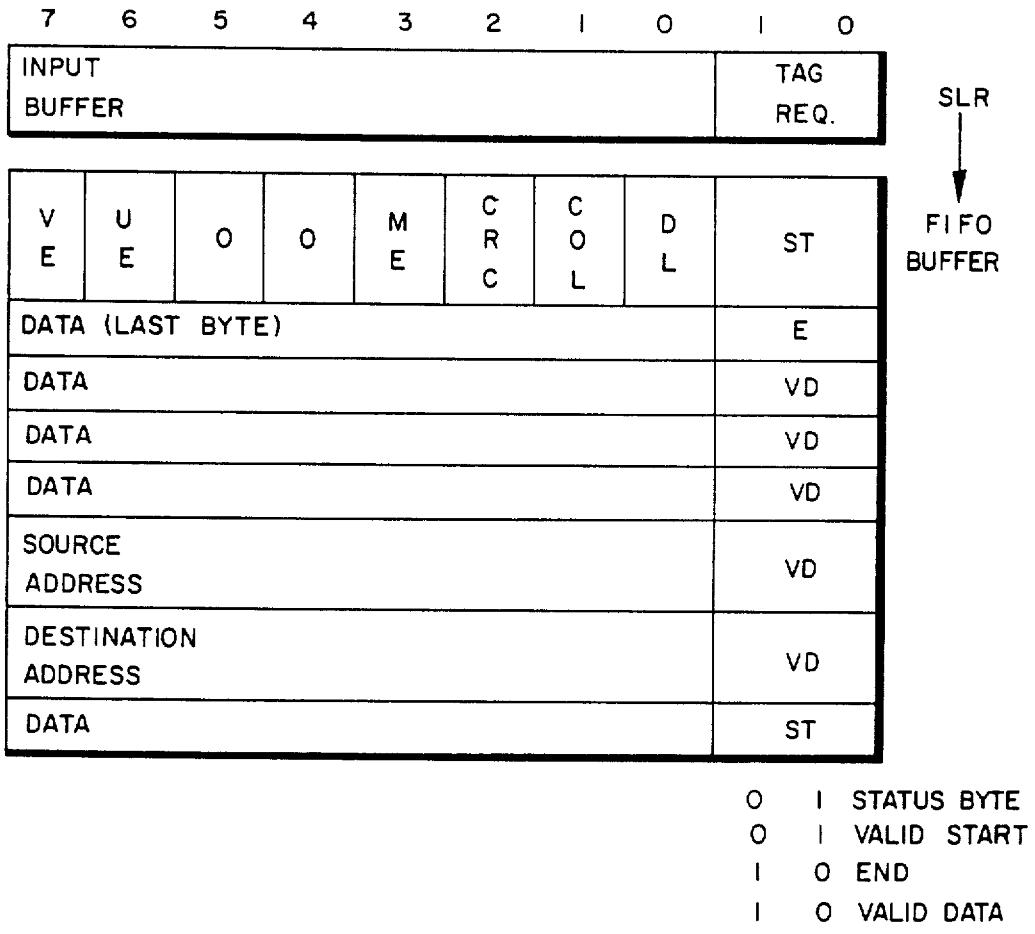
FIG. 8 is a view illustrating the makeup of a message byte for transfer from the SLR input buffer to the Input/Output Controller Receiver.

Referring particularly to FIG. 8, each byte transferred from the SLR input buffer 145 to the IOCR's FIFO buffer 123 is identified by a two bit tag. The tags indicate whether a byte is the first one of the message (ST), or data within the message (VD), or the last byte of data (E). Following the last byte of the message, a status byte is transferred to the FIFO buffer of IOCR 122 by status register 165 indicating the message status, namely VE (valid end), UE (unusual end), ME (message end), CRC (CRC error), COL (collision), and DL (data late). VE signifies that a CRC, COL, and DL did not occur. UE signifies the one or more of CRC, COL, and DL did occur. ME is the end tag on a message which indicates that the message chain was completed. Where ME equals 0, the message was aborted.

A mode register 168 obtains two mode bits from the IOCR 122 through the data bus 162, one bit representing half speed mode (HS) which is used to control the timing generator 170 for SLR 150, the other bit representing promiscuous mode (PM) which is used to inhibit address compare logic 161. Control signals from IOCR 122, are input to IOC control bus decode logic 167 where the signals are decoded to provide signals which load the identification address register 160, set and clear the SLR reset logic 167' and load and reset mode register 168.

Figure 9:
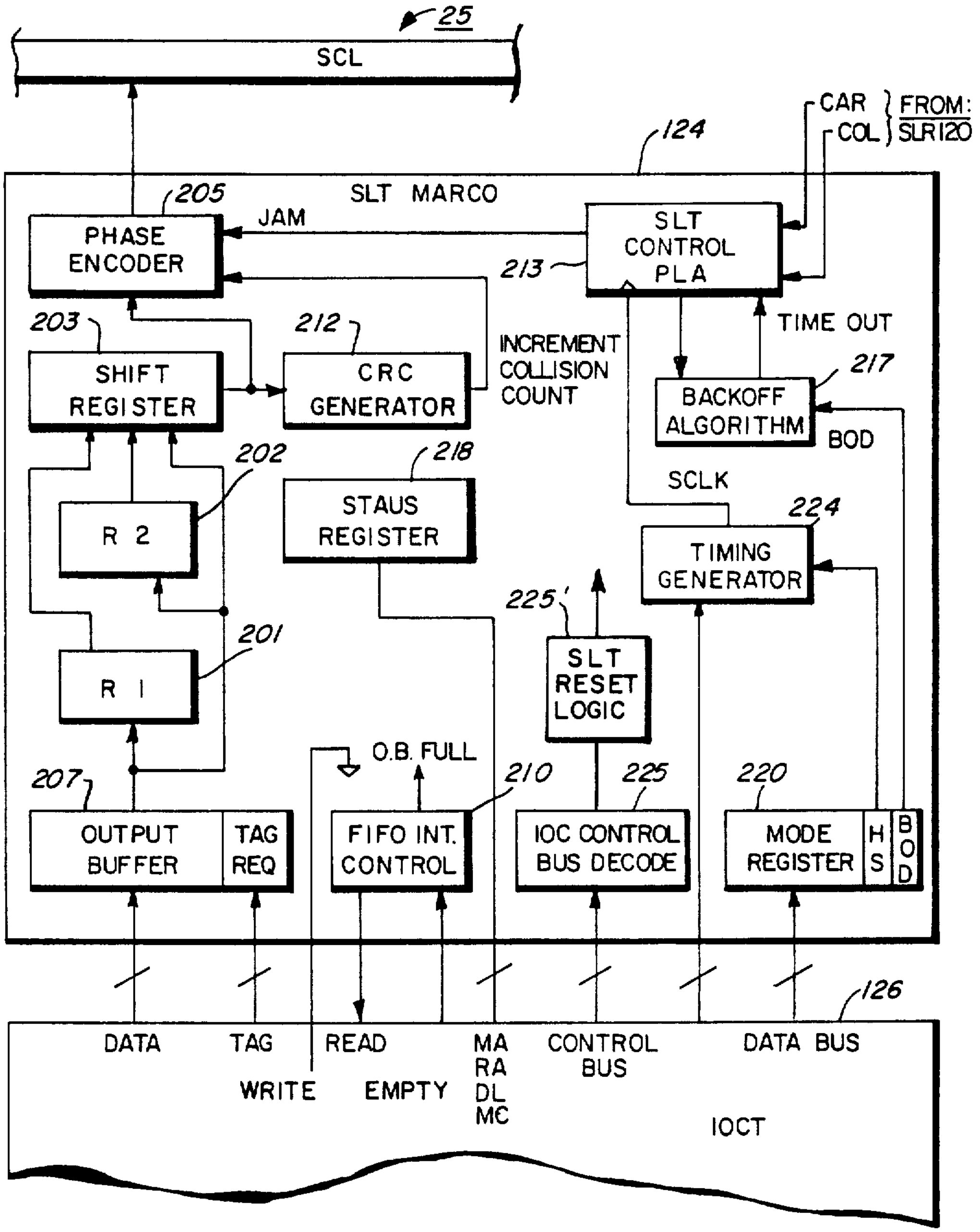
FIG. 9 is a schematic view illustrating the principal components of the shared line transmitter (SLT)

Referring to FIG. 9, SLT 124 obtains byte parallel data from the FIFO buffer 127 of IOCT 126 and loads the data into one of the registers 201, 202, 203 which shift the byte into serial form. The serial data output of registers 201, 202, 203 is fed to phase encoder 205 where the data is encoded. Operation of phase encoder 205 is controlled by a programmed logic array or PLA 213 which serves as the central controller for SLT 124.

Figure 10:
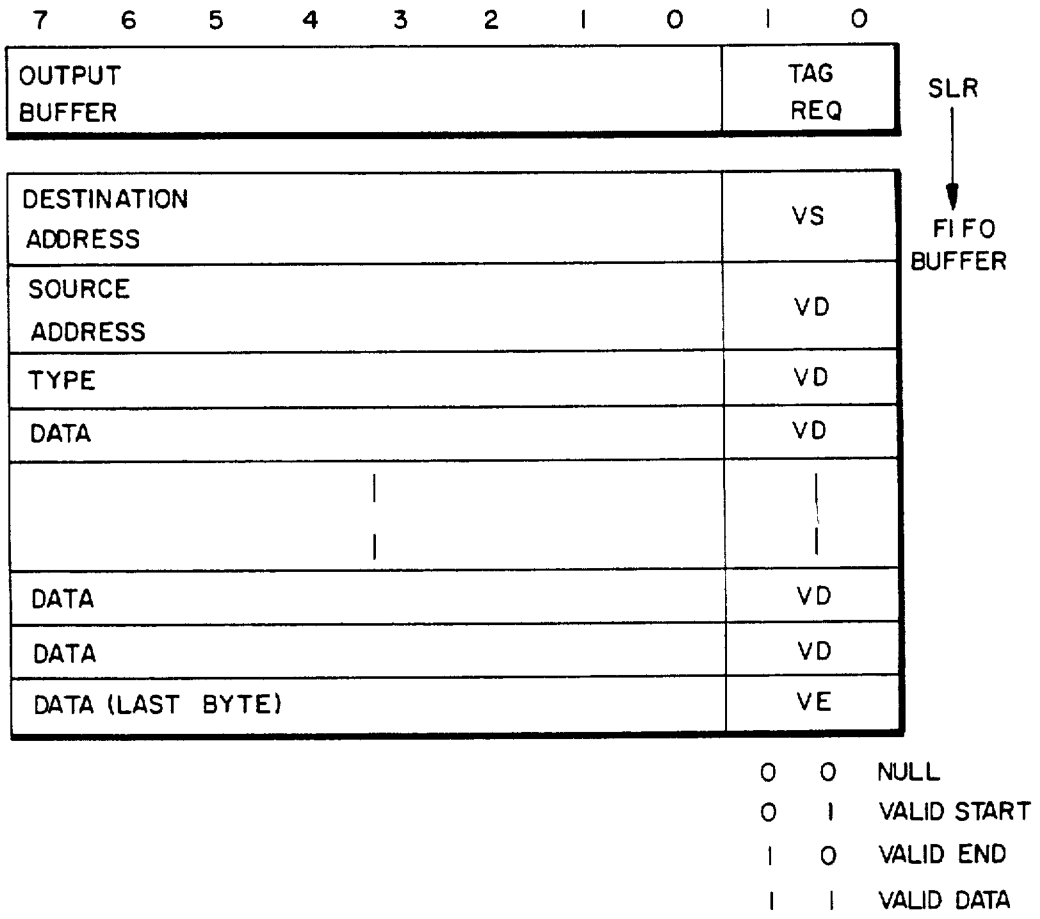
FIG. 10 is a view illustrating the makeup of a message byte as transferred from the Input/Output Controller Transmitter to the SLT's output buffer.

Data to be transmitted is obtained from RAM memory section 112 through IOCT 126, the data being input to output buffer 207 of SLT 124. When output buffer 207 is empty and the FIFO buffer 127 of IOCT 126 is not empty, the byte on top of FIFO buffer 127 is transferred into buffer 207 under the direction of a FIFO interface control 210. As shown in FIG. 10, each byte 200 transferred is identified by a two bit tag, the tags indicating whether the byte is the first one of a message (VS), data within the message (VD), or the last byte (VE). When a shift register 201, 202 or 203 is available, the byte 200 is transferred directly from the output buffer 207 to the register. Registers 201 and 202 are used when the shift register 203 is already occupied thereby provided in effect a small buffer.

CRC generator 212 processes all of the bits in the outgoing message in accordance with the polynomial $X^{16}+X^{15}+X^2+1$. At the conclusion of the message packet, generator 212 appends two CRC check bytes to the message. Phase encoder 205 converts the serial logic bits from the shift register 201, 202 or 203 (and the two bytes from the CRC generator 212) to phase encoded form for SCL 25. Encoder 205 places a start bit in front of the message and, after the CRC bytes, permits the SCL 25 to go to low level indicating end of the message.

During a transmission, if SLR 150 (FIG. 7) detects a collision, a signal from PLA 213 causes phase encoder 205 to abort transmission and jam SCL 25. In the event of a collision, a back off algorithm logic 217 is activated to generate a random number representing the period of time the remote's SLT 124 is to wait before attempting to transmit again. Back off algorithm logic 217 is implemented in hardward and includes a collision counter which counts the number of collisions and a free running counter which generates a pseudo random number. After one collision, the free running counter transfers one bit (which may be randomly either 0 or 1) to a count down counter which counts down to measure out the back off interval. After two collisions the free running counter transfers two bits to the count down counter, thereby doubling the average size of the number transferred and doubling the count down interval. The actual content of the two bits remains random. The foregoing continues up to the capacity of the counters.

At the termination of a message transmission, a status register 218 accumulates information concerning the circumstances under which the transmission ended, namely, message abort (MA), retry abort (RA), data late (DL), and message complete (MC), and makes this information available to the IOCT 126. A mode register 220 obtains two mode bits from IOCT 126, one mode bit representing the half speed (HS) mode which is applied to a timing generator 224 for SLT 213 and the other mode bit a back off disable (BOD) bit, which is input to the back off algorithm logic 217. A decode logic 225 decodes control signals from IOCT 126 to provide signals which set and clear the SLT's reset logic, 225', and load and reset mode register 220.

Figure 11:
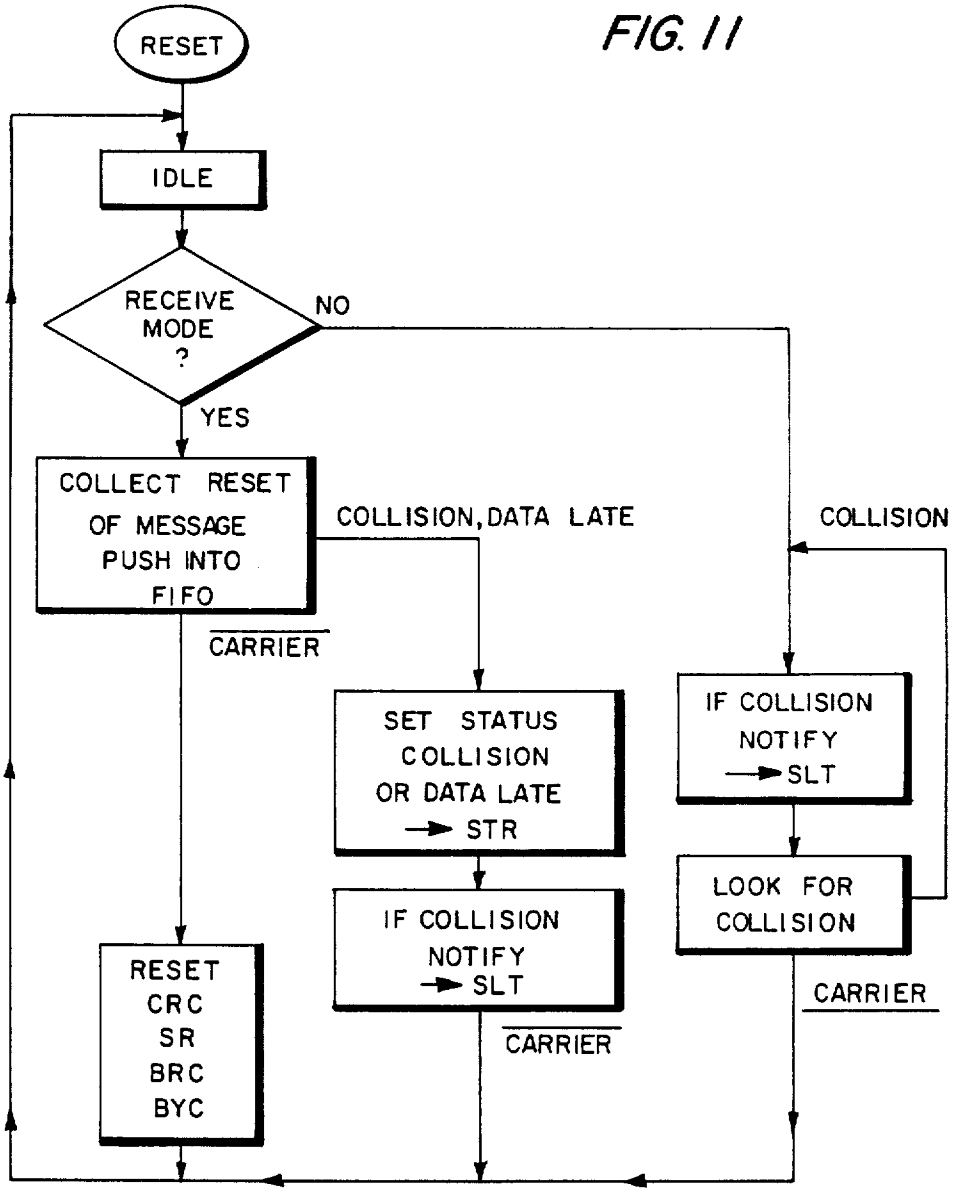
FIG. 11 is a flow chart illstrating operation of the SLR in the receive mode.
Figure 12:
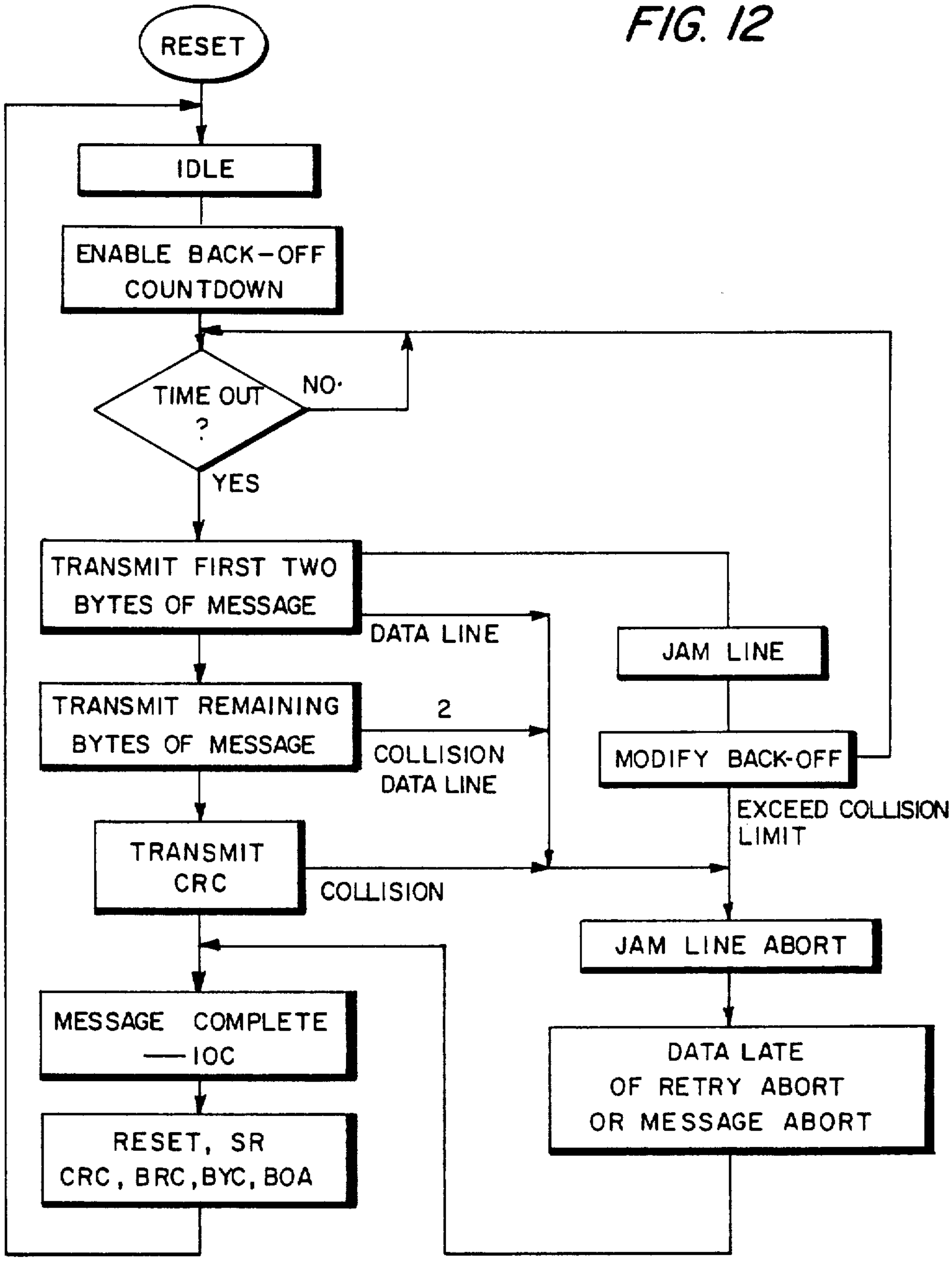
FIG. 12 is a flow chart illustrating operation of the SLT in the transmit mode.

Referring to the flow charts of FIGS. 11 and 12, the remote's SLR 120 and SLT 124 are normally in a quiescent state (IDLE). In this state, the remote's SLR 120 scans the SCL 25 for messages. If a collision (COLL) is detected by the remote's SLR 120, the SLR jams SCL 25 and notifies the remote's SLT 124. If the remote's SLT is attempting to transmit, the back off algorithm logic 217 is actuated to impose a random delay before the remote's SLT is allowed to attempt transmitting the message packet.

On detecting a message packet on SCL 25 bearing the remote's address (or a broadcast message or any message where the remote is in the promiscuous or PM mode), the remote enters a receive mode and collects the message. Following decoding by decoder 147 and shifting through shift registers 140, 141, 142, the message is passed through input buffer 145 and the IOCR's FIFO buffer 123 to the remote's RAM memory section 112.

If the message is late (DL) or a collision (COL) is detected, the appropriate bit in status mode register 168 is set. Where the collision (COL) bit is set, the SLT 124 of the remote is notified and the SCL 25 jammed.

Where the remote wishes to transmit a message and presuming that transmission is not inhibited by a previously detected collision, the message packet is transmitted from the remote's RAM memory section 112 via the IOCT's FIFO buffer 127 to the SLT's output buffer 207. From output buffer 207, the message packet passes via one of the shift registers 201, 202 or 203 to phase encoder 205. There the message is phase encoded and placed on SCL 25. At the same time, the message is passed through CRC generator 217 which appends to the terminal end of the message the CRC check sum bytes.

In the event a collision is detected, the remote SLR 120 inputs a collision (COLL) signal to the PLA 213. The signal from PLA 13 to phase encoder 205 causes a jam signal to be placed on SCL 25. At the same time, PLA 213 actuates back off algorithm logic 217 to impose a random time delay on the SLT 124 before transmission of the message packet is attempted again.

By the aforedescribed message transmitting system, control instructions between CPM 19 and the remote processing modules 9, 11, 13, 15 and 17 that comprise reproduction machine 5 are transmitted and received through a single shared communication line (SCL) 25 to provide an integrated machine operable to produce copies in accordance with the copy run instructions programmed by the machine operator through control panel 38.

U.S. application Ser. No. 205,809, filed 11/10/80, now abandoned, is hereby incorporated by reference for appropriate teachings of additional or alternative details, features, and/or technical background.

While the invention is disclosed in the context of a reproduction machine or copier herein, other types and forms of reproduction machines, or printing machines, may instead be envisioned such as ink jet type printers, raster input and/or output scanners, facsimile machines, and so forth.

While the invention has been described with reference to the structure disclosed, it is not confined to the details set forth, but is intended to cover such modifications or changes as may come within the scope of the following claims.

We claim:

1. In a copy reproducing machine for making copies of document originals having a master control module and remote operating modules cooperable with one another to form said copy reproducing machine, the combination of:

(a) a shared communication line linking said modules together, said shared communication line serving as the sole vehicle for communicating control instructions between said modules for making said copies;

(b) a shared line transmitter for each of said modules including (1) means for addressing control instructions from the module to at least one other of said modules, and (2) means for placing said control instructions following said addressing onto said shared communication line for transmission over said shared communication line to said modules; and (c) a shared line receiver for each of said modules including (1) means for detecting control instructions addressed to said module from control instructions addressed to other modules being transmitted on said shared communication line, and (2) means for receiving said control instructions addressed to said module from said shared communication line to said module.

2. The copy reproducing machine according to claim 1 including means for clocking said control instructions communicating by said shared communication line to each of said modules in synchronism, so as to insure that such modules cooperate as a unitary machine when reproducing the copies.

3. The method of operatively integrating plural discrete copier modules to provide a copier operable to produce copies of document originals, and wherein each copier module generates and/or receives control instructions, comprising the steps of:

(a) addressing control instructions at each of said copier modules for transmission to at least one other of said copier modules;

(b) inserting said addressed control instructions into a common serial stream of control instructions being communicated to said copier modules; and (c) receiving at each of said copier modules control instructions in said serial stream addressed to said copier module.

4. The method according to claim 3 including the step of:

communicating said control instructions in said serial stream at a preset clock rate to each of said modules so as to synchronize operation of said copier modules to perform as a unitary machine when reproducing the copies.

* * * * *